US012573605B2

(12) United States Patent
Tiwari et al.

(10) Patent No.: US 12,573,605 B2
(45) Date of Patent: Mar. 10, 2026

(54) DRY ELECTRODE MANUFACTURE WITH COMPOSITE BINDER

(71) Applicant: LICAP TECHNOLOGIES, INC., Sacramento, CA (US)

(72) Inventors: Bibek Tiwari, Sacramento, CA (US); Linda Zhong, Sacramento, CA (US); Bae Hyun Kim, Sacramento, CA (US); Hyeunhwan An, Sacramento, CA (US)

(73) Assignee: LICAP TECHNOLOGIES, INC., Sacramento, CA (US)

( * ) Notice: Subject to any disclaimer, the term of this patent is extended or adjusted under 35 U.S.C. 154(b) by 0 days.

(21) Appl. No.: 18/741,348

(22) Filed: Jun. 12, 2024

(65) Prior Publication Data

US 2024/0332488 A1     Oct. 3, 2024

Related U.S. Application Data

(63) Continuation of application No. 17/097,200, filed on Nov. 13, 2020, now Pat. No. 12,040,474.

(51) Int. Cl.
*H01M 4/04* (2006.01)
*H01G 11/06* (2013.01)
(Continued)

(52) U.S. Cl.
CPC ............ *H01M 4/043* (2013.01); *H01G 11/06* (2013.01); *H01G 11/28* (2013.01); *H01G 11/30* (2013.01);
(Continued)

(58) Field of Classification Search
None
See application file for complete search history.

(56) References Cited

U.S. PATENT DOCUMENTS 11,876,230 B2     1/2024   Duong et al.
12,040,474 B2 *   7/2024   Tiwari ................... H01M 4/622
(Continued)

FOREIGN PATENT DOCUMENTS

CN       102629681 B     10/2013
GB        1421514 A       1/1976
(Continued)

OTHER PUBLICATIONS

Office Action for Korean Patent Application No. 10-2021-0152722; mailed Dec. 27, 2024.
(Continued)

*Primary Examiner* — Lisa S Park
(74) *Attorney, Agent, or Firm* — Stetina Garred Brucker & Newboles

(57) ABSTRACT

A free-standing electrode film may comprise an electrode active material and a composite binder comprising polytetrafluoroethylene (PTFE) and polyvinylpyrrolidone (PVP). An electrode for an energy storage device may comprise a current collector and a film on the current collector, the film including an electrode active material and a composite binder comprising PTFE and PVP. A method of manufacturing a free-standing electrode film may comprise preparing a mixture including an electrode active material and a composite binder, the composite binder comprising PTFE and one or more additional binders selected from the group consisting of PVP, polyvinylidene fluoride (PVDF), polyethylene oxide (PEO), and carboxymethylcellulose (CMC). The method may further comprise adding a solvent to the mixture, subjecting the mixture to a shear force, and, after the solvent has been added and the mixture has been subjected to the shear force, pressing the mixture into a free-standing film.

7 Claims, 8 Drawing Sheets

(51) Int. Cl.

| | |
|---|---|
| *H01G 11/28* | (2013.01) |
| *H01G 11/30* | (2013.01) |
| *H01G 11/86* | (2013.01) |
| *H01M 4/139* | (2010.01) |
| *H01M 4/62* | (2006.01) |
| *H01M 10/0525* | (2010.01) |

(52) U.S. Cl.
CPC ............ *H01G 11/86* (2013.01); *H01M 4/139* (2013.01); *H01M 4/623* (2013.01); *H01M 10/0525* (2013.01)

(56) References Cited

U.S. PATENT DOCUMENTS

| | | |
|---|---|---|
| 2018/0277847 A1 | 9/2018 | Saidi |
| 2019/0190017 A1 | 6/2019 | Hayashi |

FOREIGN PATENT DOCUMENTS

| | | | |
|---|---|---|---|
| JP | 2006169448 | A | 6/2006 |
| JP | 4179648 | B2 | 11/2008 |
| KR | 1020050058556 | A | 6/2005 |
| KR | 100581230 | B1 | 6/2006 |
| KR | 1020200017821 | A | 2/2020 |
| KR | 1020200090744 | A | 7/2020 |
| WO | 2019103874 | A1 | 5/2019 |

OTHER PUBLICATIONS

Second Office Action for Chinese Application No. 202111334278.9; mailed Jan. 15, 2025.

First Office Action for Chinese Application No. 202111334278.9; mailed May 17, 2024.

Office Action for Chinese Patent Application No. 202111334278.9; mailed Apr. 28, 2025.

Japanese Office Action for Application No. 2023-205018; mailed Jul. 25, 2025.

Japanese Decision of Rejection for Application No. 2023-205018; mailed Dec. 2, 2025.

Examination Report for European patent application No. 21203694.1; mailed Dec. 15, 2025.

* cited by examiner

DRY ELECTRODE MANUFACTURE WITH COMPOSITE BINDER

CROSS-REFERENCE TO RELATED APPLICATIONS

This application is a continuation of U.S. patent application Ser. No. 17/097,200, filed Nov. 13, 2020 and entitled "DRY ELECTRODE MANUFACTURE WITH COMPOSITE BINDER," the entire disclosure of which is hereby incorporated by reference.

STATEMENT RE: FEDERALLY SPONSORED RESEARCH/DEVELOPMENT

Not Applicable

BACKGROUND

1. Technical Field

The present disclosure relates generally to manufacturing electrodes for energy storage devices such as batteries and Li-ion capacitors and, more particularly, to the manufacture of a free-standing electrode film by a dry process.

2. Related Art

As demand for inexpensive energy storage devices increases, various methods have been proposed for manufacturing electrodes. Among these, there exist so-called "dry" processes by which a free-standing electrode film may be manufactured while avoiding the expense and drying time associated with the solvents and aqueous solutions that are typically used in slurry coating and extrusion processes. In order to produce higher quality electrodes by such a dry process that may result in energy storage devices having higher energy density, the amount of binder mixed with the active material should be minimized within a range that still allows for an electrode film to be reliably produced without excessive breakage. To this end, the binder may be chemically activated to improve its adhesion strength by the addition of a highly vaporizable solvent as described in the present inventor's own U.S. Pat. No. 10,069,131, entitled "Electrode for Energy Storage Devices and Method of Making Same," the entirety of the disclosure of which is wholly incorporated by reference herein. However, further reduction in the amount of binder needed is desirable, especially in the case of producing electrodes for batteries, whose active materials may require more binder than those of ultracapacitors and other energy storage devices.

One method for further reducing the amount of binder needed is by temperature activation of the binder, either alone or in combination with chemical activation, as described in the present inventor's own U.S. patent application Ser. No. 16/874,502, filed May 14, 2020 and entitled "Dry Electrode Manufacture by Temperature Activation Method," the entirety of the disclosure of which is wholly incorporated by reference herein. Active material loading and the electrode film quality improve significantly by a combination of chemical activation and/or temperature activation when making battery electrodes using the dry method.

Another method for further reducing the amount of binder needed is to lubricate the active material mixture with a polymer-containing additive solution or conductive paste prior to adding the binder, either alone or in combination with chemical activation, as described in the present inventor's own U.S. patent application Ser. No. 17/014,862, filed Sep. 8, 2020 and entitled "Dry Electrode Manufacture with Lubricated Active Material Mixture," the entirety of the disclosure of which is wholly incorporated by reference herein. The process allows for lower binder content and higher active loading formulations, resulting in energy storage devices with improved discharge characteristics including higher discharge capacity, higher first cycle efficiency, and higher C rate.

Despite the above improvements, better electrode quality remains desirable.

BRIEF SUMMARY

The present disclosure contemplates various methods for overcoming the drawbacks accompanying the related art. One aspect of the embodiments of the present disclosure is a free-standing electrode film. The free-standing electrode film may comprise an electrode active material and a composite binder comprising polytetrafluoroethylene (PTFE) and polyvinylpyrrolidone (PVP).

Another aspect of the embodiments of the present disclosure is a method of manufacturing an electrode for an energy storage device. The method may comprise laminating the above free-standing electrode film on a current collector.

Another aspect of the embodiments of the present disclosure is an electrode for an energy storage device. The electrode may comprise a current collector and a film on the current collector, the film including an electrode active material and a composite binder comprising PTFE and PVP.

The composite binder of the above free-standing electrode film or the above electrode may further comprise polyvinylidene fluoride (PVDF).

The composite binder of the above free-standing electrode film or the above electrode may further comprise polyethylene oxide (PEO).

The composite binder of the above free-standing electrode film or the above electrode may further comprise carboxymethylcellulose (CMC).

Another aspect of the embodiments of the present disclosure is a battery, a lithium-ion capacitor, or an ultracapacitor comprising the above electrode.

Another aspect of the embodiments of the present disclosure is a method of manufacturing a free-standing electrode film. The method may comprise preparing a mixture including an electrode active material and a composite binder, the composite binder comprising PTFE and one or more additional binders selected from the group consisting of PVP, PVDF, PEO, and CMC, adding a solvent to the mixture, subjecting the mixture to a shear force, and, after the solvent has been added and the mixture has been subjected to the shear force, pressing the mixture into a free-standing film.

The composite binder may comprise PTFE, PVP, and one or more additional binders selected from the group consisting of PVDF, PEO, and CMC.

The solvent may comprise one or more chemicals selected from the group consisting of acetone, isopropyl alcohol, propanol, ethanol, butanol, methanol, tetrachloroethylene, toluene, methyl acetate, ethyl acetate, hexane, and benzene.

Another aspect of the embodiments of the present disclosure is a method of manufacturing an electrode for an energy storage device. The method may comprise the above method of manufacturing the free-standing electrode film and laminating the free-standing film on a current collector.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of free-standing electrode films and their methods of manufacture, as well as electrodes and energy storage devices produced therefrom. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
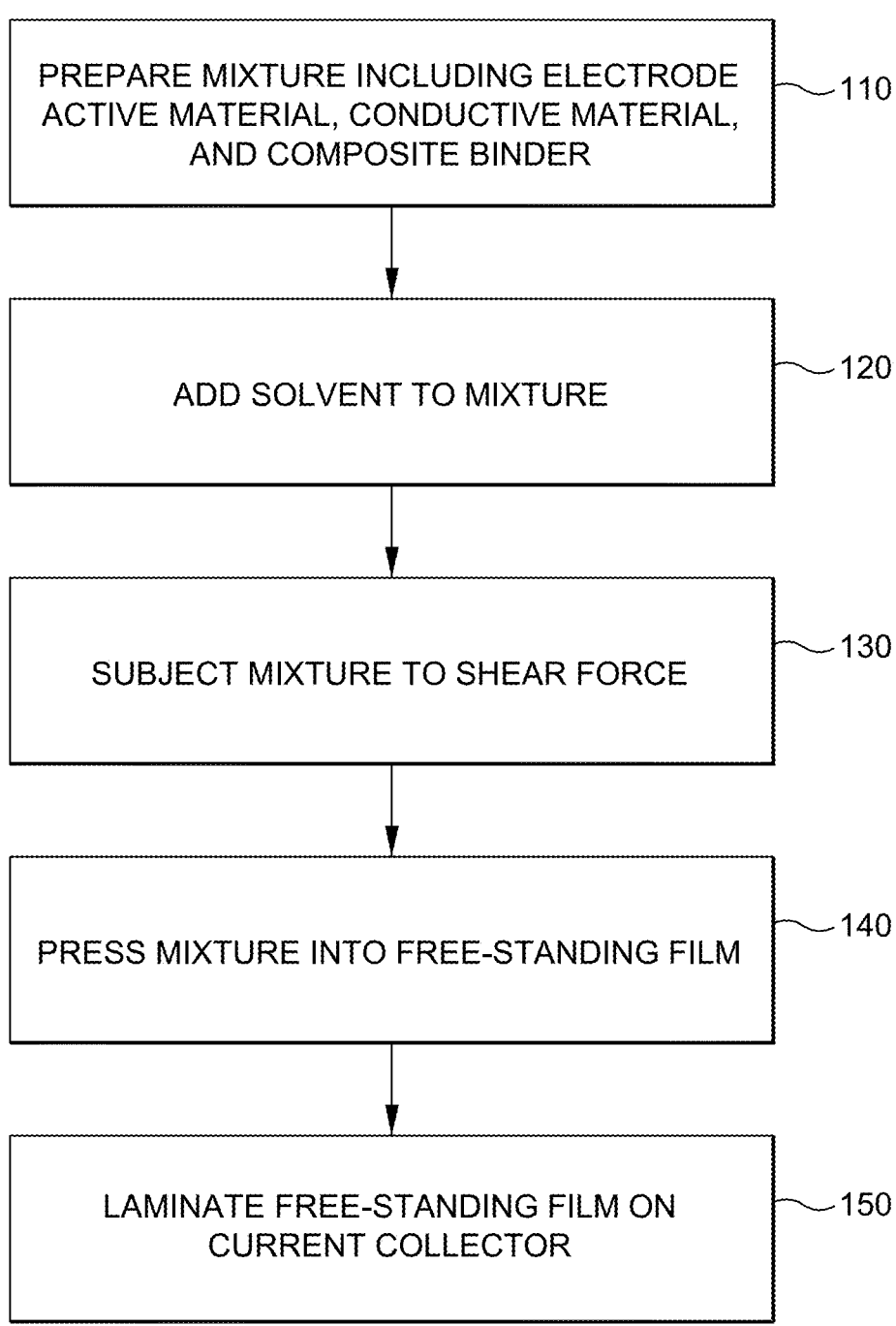
FIG. 1 shows an example operational flow for manufacturing a free-standing electrode film or an electrode produced therefrom.

FIG. 1 shows an operational flow for manufacturing a free-standing electrode film or an electrode produced therefrom. Like the dry process described in U.S. Pat. No. 10,069,131, the process exemplified by FIG. 1 may include chemically activating a binder to improve its adhesion strength by the addition of a highly vaporizable solvent. However, it has been found that the binder polytetrafluoroethylene (PTFE), which is conventionally selected for its flexible consistency as needed in dry processes, reacts with the intercalated lithium in the active material of the negative electrode, resulting in a loss of capacity that occurs during the first charging cycle of the battery or other energy storage device. In order to reduce this effect, the disclosed processes use a composite binder including PTFE and an additional binder, preferably polyvinylpyrrolidone (PVP). As a result, the disclosed processes can produce an energy storage device having substantially greater first cycle efficiency as compared to those made by conventional dry processes.

The operational flow of FIG. 1 may begin with a step 110 of preparing a mixture (e.g. a powder mixture) including an electrode active material and a composite binder. Depending on the energy storage device to be produced, the electrode active material may be, for example, activated carbon, graphite, silicon, hard carbon, soft carbon, a lithium metal oxide such as lithium titanate oxide, or a combination thereof. In some cases, for example, if the electrode active material is not sufficiently conductive, a conductive material may also be included in the mixture. Example conductive materials that may be added include metal particles, conductive carbon (e.g. activated carbon, graphite, hard carbon, carbon black), carbon nanotubes (CNT), a conducting polymer, and combinations thereof. Examples of conductive carbon black may include acetylene black, Ketjen black, and super P (e.g. a carbon black sold under the trade name SUPER PR by Imerys Graphite & Carbon of Switzerland). The mixture may be prepared by any kind of mixing equipment for mixing powders, such as roller tanks, conventional blenders, kitchen mixers, conventional mixers for mixing cement materials or medical materials, etc.

The operational flow of FIG. 1 may continue with adding a small amount of a highly vaporizable solvent to the mixture (step 120). The selected solvent may activate the composite binder to improve its adhesion strength, while being highly vaporizable (e.g. having a low boiling point) such that no drying process is necessary to remove the solvent afterwards. Example solvents may include hydrocarbons (e.g. hexane, benzene, toluene), acetates (e.g. methyl acetate, ethyl acetate), alcohols (e.g. propanol, methanol, ethanol, isopropyl alcohol, butanol), glycols, acetone, dimethyl carbonate (DMC), diethylcarbamazine (DEC), tetrachloroethylene, etc. The mixture may then be subjected to a shear force (step 130), for example, by blending it in a blender such as an ordinary kitchen blender or an industrial blender. Adequate shear force to deform (e.g. elongate) the composite binder, resulting in a stickier, more pliable mixture, may be achieved by blending the mixture in such a blender at around 10,000 RPM for 1-10 min (e.g. 5 min). Preferably, a high-shear mixer may be used, such as a high-shear granulator (e.g. a jet mill). The solvent that is added in step 120 to chemically activate the composite binder may in some cases be injected into the mixture while the mixture is being subjected to the shear force in step 130. Thus, steps 120 and 130 can be performed in a single step.

After the mixture has been subjected to the shear force, the operational flow of FIG. 1 may continue with a step 140 of pressing the mixture to produce a free-standing film, for example, using a roller press (e.g. at a temperature of 150° C. and a roll gap of 20 μm). The electrode film may thereafter be laminated on a current collector (e.g. copper or aluminum) to produce an electrode in step 150.

The composite binder may comprise PTFE and one or more additional binders selected from the group consisting of polyvinylpyrrolidone (PVP), polyvinylidene fluoride (PVDF), polyethylene oxide (PEO), and carboxymethylcellulose (CMC). Table 1, below, shows the resulting first cycle efficiency for different formulations of the composite binder as compared to a comparative example using only PTFE as the binder.

TABLE 1

| # | Formulation (wt. %) | Film Thickness (μm) | Loading (mAh/ cm$^2$) | Voltage before testing (V) | 1$^{st}$ Cycle Charge Capacity (mAh/g) | 1$^{st}$ Cycle Discharge Capacity (mAh/g) | 1$^{st}$ Cycle Efficiency |
|---|---|---|---|---|---|---|---|
| C1 | 98% | 177 | 8.5 | 3.27 | 391.0 | 332.3 | 85.0% |
| | graphite/ | 174 | 8.3 | 3.20 | 394.1 | 335.6 | 85.2% |
| | 2% PTFE | 176 | 8.4 | 3.18 | 391.2 | 334.5 | 85.5% |
| | (comparative | 157 | 7.2 | 3.26 | 391.6 | 332.7 | 85.0% |
| | example) | 161 | 7.4 | 3.16 | 387.0 | 333.0 | 86.0% |
| | | 150 | 6.9 | 3.17 | 393.6 | 336.9 | 85.6% |
| | | | Average: | | 391.4 | 334.2 | 85.4% |
| 1 | 96% | 176 | 8.4 | 3.21 | 372.7 | 337.9 | 90.7% |
| | graphite/ | 177 | 8.1 | 3.21 | 372.1 | 337.6 | 90.7% |
| | 2% PTFE/ | 187 | 8.9 | 3.22 | 371.6 | 337.1 | 90.7% |
| | 1.85% | | Average: | | 372.1 | 337.6 | 90.7% |
| | PEO/0.15% | | | | | | |
| | CMC | | | | | | |
| 2 | 96% | 155 | 7.2 | 3.20 | 383.2 | 338.4 | 88.3% |
| | graphite/ | 161 | 7.4 | 3.16 | 383.5 | 338.5 | 88.3% |
| | 2% PTFE/ | 169 | 7.7 | 3.15 | 382.1 | 336.9 | 88.2% |
| | 2% CMC | | Average: | | 382.9 | 338.0 | 88.3% |
| 3 | 96% | 178 | 7.9 | 3.20 | 373.2 | 340.0 | 91.1% |
| | graphite/ | 180 | 8.1 | 3.22 | 372.6 | 339.7 | 91.2% |
| | 2% PTFE/ | 184 | 8.1 | 3.20 | 369.0 | 336.8 | 91.3% |
| | 2% PVDF | 174 | 7.8 | 3.21 | 372.5 | 339.5 | 91.1% |
| | | | Average: | | 371.8 | 339.0 | 91.2% |
| 4 | 96% | 157 | 7.3 | 3.22 | 371.0 | 340.5 | 91.8% |
| | graphite/ | 155 | 7.3 | 3.22 | 368.9 | 339.4 | 92.0% |
| | 2% PTFE/ | 149 | 7.1 | 3.21 | 370.7 | 340.5 | 91.9% |
| | 2% PVP | 146 | 6.9 | 3.21 | 370.5 | 341.2 | 92.1% |
| | | | Average: | | 370.3 | 340.4 | 91.9% |

As can be seen in Table 1, the inclusion of additional binders in the binder formulation has the effect of increasing the first cycle efficiency as compared to using only PTFE. For example, in the particular example of Table 1, the first cycle efficiency increases from approximately 85.4% when using only PTFE to approximately 88.3%, 90.7%, 91.2%, or 91.9% depending on the particular composite binder formulation used. In this case, the highest first cycle efficiency was observed when the composite binder was a mixture of PTFE and PVP at a 1:1 ratio.

Figure 2:
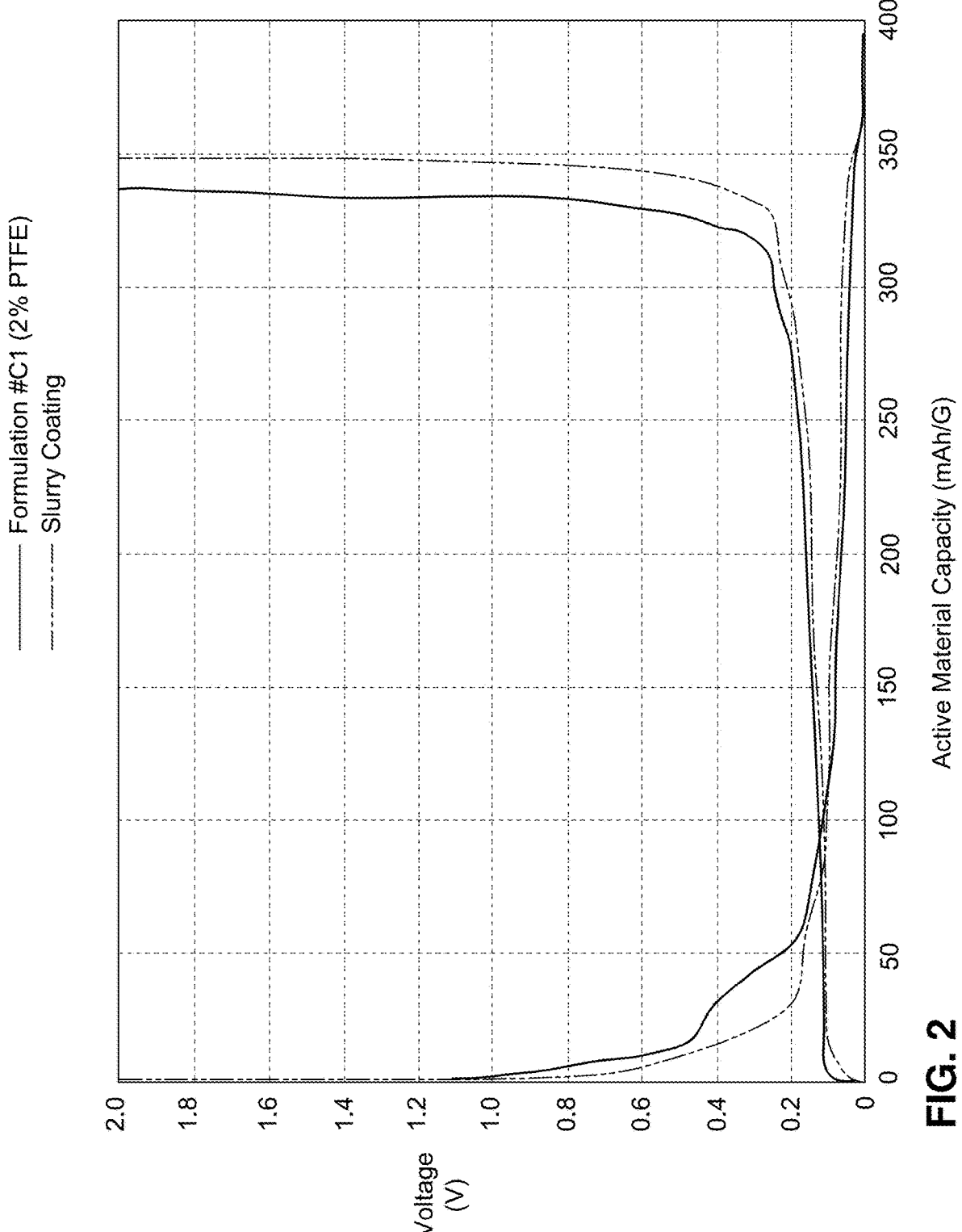
FIG. 2 shows first cycle charge and discharge curves for an electrode made by a dry process using only polytetrafluoroethylene (PTFE) as the binder as compared to an electrode made by a slurry coating process.

FIG. 2 shows first cycle charge and discharge curves for an electrode made by a dry process using only PTFE as the binder according to formulation C1 in Table 1 (solid lines) as compared to an electrode made by a slurry coating process (long and short dashed lines), the latter data being provided in a datasheet of a graphite supplier. As can be seen, the inclusion of PTFE (which is typical for dry electrode manufacturing processes) causes a voltage plateau at around 0.55 V. This voltage plateau is found to be related to the capacity loss during the first cycle due to the reaction of PTFE and lithium, which is inversely proportional to the first cycle efficiency.

Figure 3:
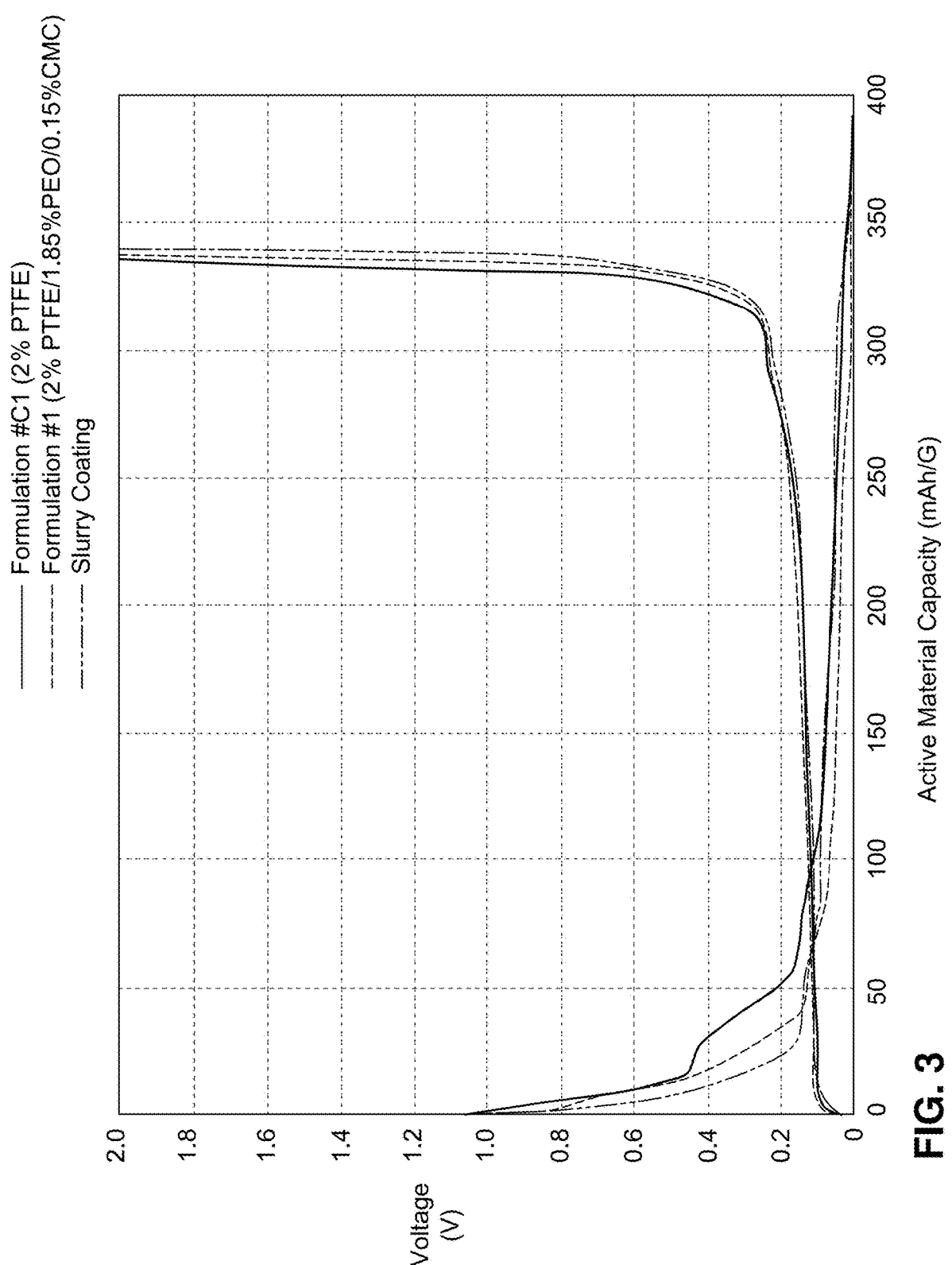
FIG. 3 shows the same first cycle charge and discharge curves of FIG. 2, with the addition of curves for an electrode made by a dry process using a composite binder.

FIG. 3 shows the same first cycle charge and discharge curves of FIG. 2, with the addition of curves for an electrode made by a dry process using a composite binder containing 2% PTFE, 1.85% PEO, and 0.15% CMC according to formulation 1 in Table 1 (dashed lines). As can be seen from the reduced significance of the voltage plateau, the inclusion of PEO and CMC inhibits the reaction of PTFE with lithium, resulting in less capacity loss during the first cycle and thus increased first cycle efficiency as compared to formulation C1 (see Table 1).

Figure 4:
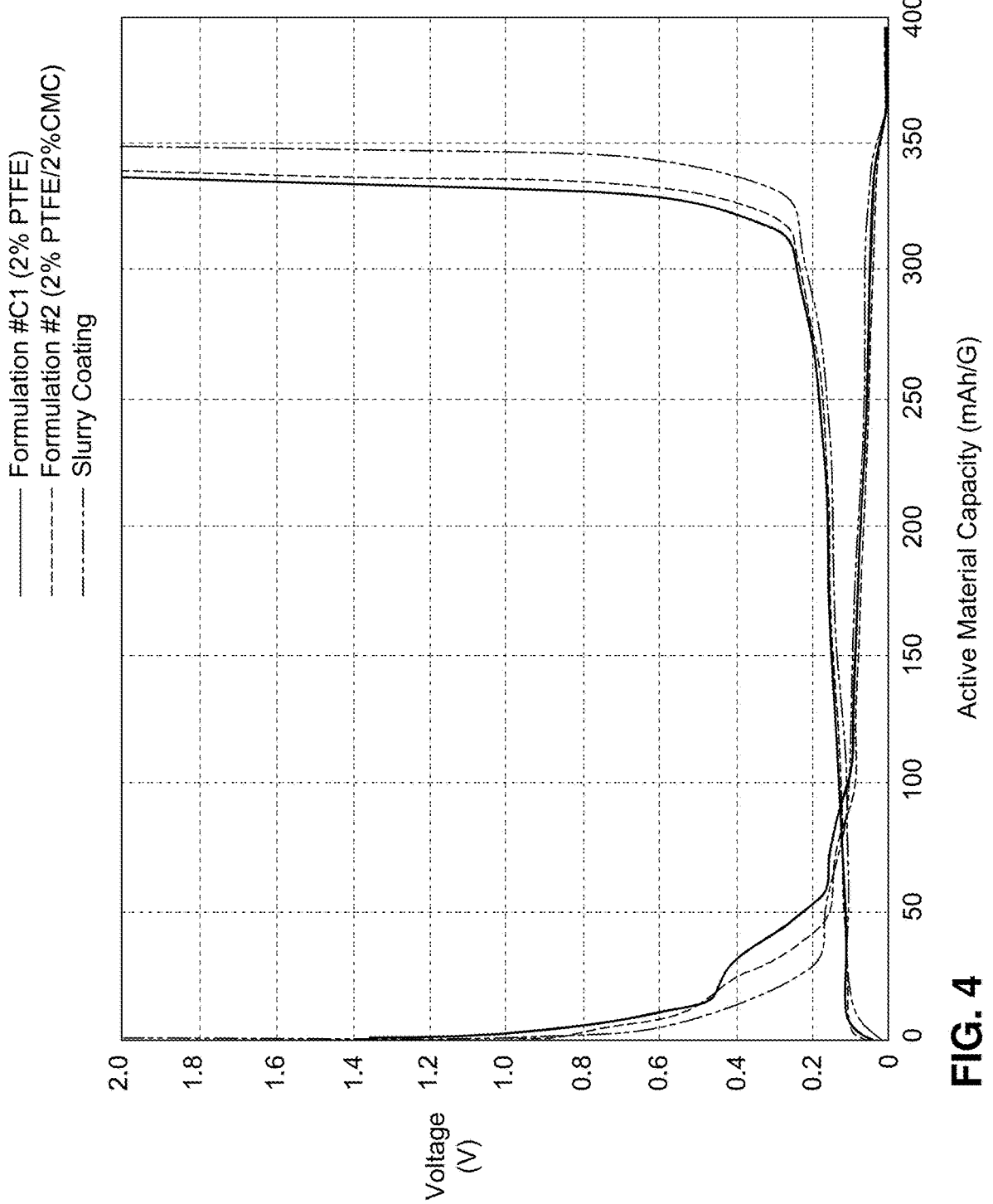
FIG. 4 shows the same first cycle charge and discharge curves of FIG. 2, with the addition of curves for an electrode made by a dry process using another composite binder.

FIG. 4 shows the same first cycle charge and discharge curves of FIG. 2, with the addition of curves for an electrode made by a dry process using a composite binder containing 2% PTFE and 2% CMC according to formulation 2 in Table 1 (dashed lines). Again, as can be seen from the reduced significance of the voltage plateau, the inclusion of CMC inhibits the reaction of PTFE with lithium, resulting in less capacity loss during the first cycle and thus increased first cycle efficiency as compared to formulation C1 (see Table 1).

Figure 5:
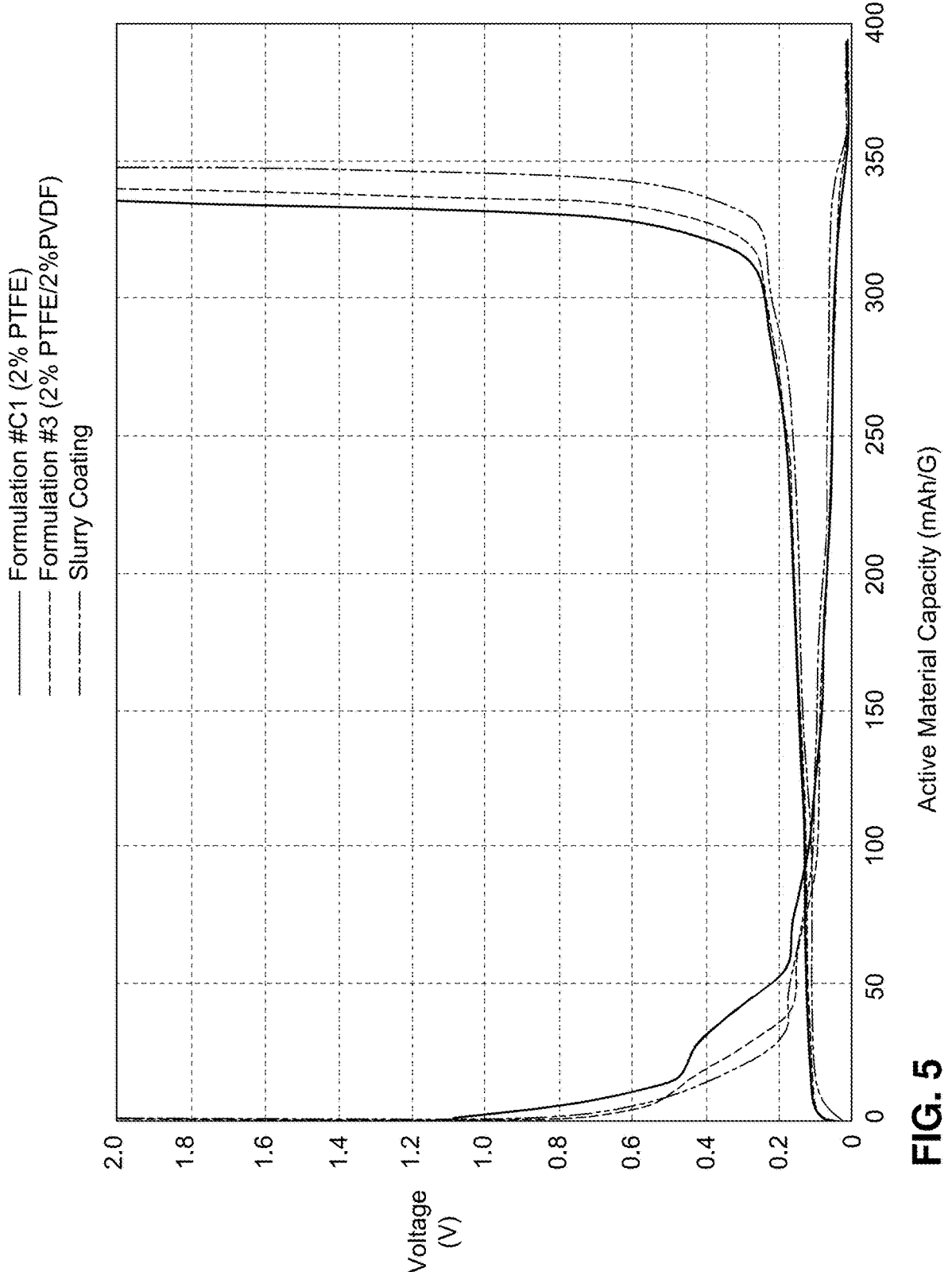
FIG. 5 shows the same first cycle charge and discharge curves of FIG. 2, with the addition of curves for an electrode made by a dry process using another composite binder.

FIG. 5 shows the same first cycle charge and discharge curves of FIG. 2, with the addition of curves for an electrode made by a dry process using a composite binder containing 2% PTFE and 2% PVDF according to formulation 3 in Table 1 (dashed lines). Again, as can be seen from the reduced significance of the voltage plateau, the inclusion of PVDF inhibits the reaction of PTFE with lithium, resulting in less capacity loss during the first cycle and thus increased first cycle efficiency as compared to formulation C1 (see Table 1).

Figure 6:
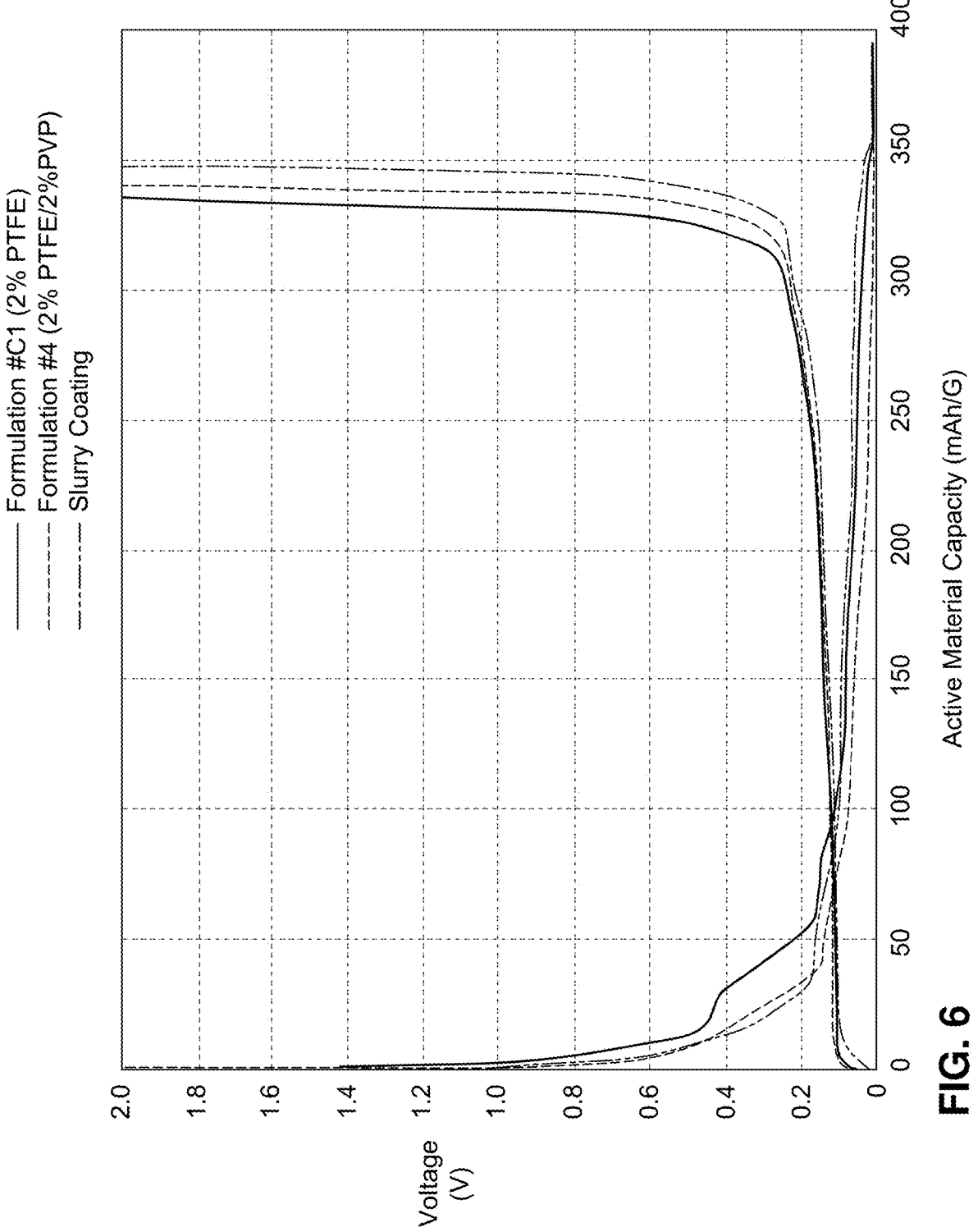
FIG. 6 shows the same first cycle charge and discharge curves of FIG. 2, with the addition of curves for an electrode made by a dry process using another composite binder.

FIG. 6 shows the same first cycle charge and discharge curves of FIG. 2, with the addition of curves for an electrode made by a dry process using a composite binder containing 2% PTFE and 2% PVP according to formulation 4 in Table 1 (dashed lines). Again, as can be seen from the reduced significance of the voltage plateau, the inclusion of PVP inhibits the reaction of PTFE with lithium, resulting in less capacity loss during the first cycle and thus increased first cycle efficiency as compared to formulation C1 (see Table 1). In this case, the effect is particularly dramatic, with the first cycle discharge curve nearly matching that of the electrode made by slurry coating.

Figure 7:
FIG. 7 shows first cycle efficiency data plotted for different binder formulations.

FIG. 7 shows the first cycle efficiency data plotted for each of formulations 1-4 and C1 of Table 1. As can be seen from a comparison with FIGS. 2-6, the first cycle efficiency is inversely proportional to the capacity loss attributable to the voltage plateau at around 0.55 V. When a composite binder is used as disclosed herein, the inhibiting effect of the additional binder(s) on the reaction of PTFE with lithium reduces the capacity loss caused by the reaction, resulting in a less pronounced voltage plateau and greater first cycle efficiency.

As discussed above, PTFE has a tendency to react with the intercalated lithium in the active material of the negative electrode, which is understood to result in a loss of capacity and thus the reduced first cycle efficiency. The effect is even more pronounced when a greater amount of PTFE is used, as is more typical when producing an electrode film having enough strength to be usable in manufacturing an energy storage device. Table 2, below, shows the resulting first cycle efficiency when using only PTFE as the binder in two different amounts.

TABLE 2

| # | Formulation (wt. %) | Film Thickness (μm) | Loading (mAh/cm²) | Voltage before testing (V) | 1ˢᵗ Cycle Charge Capacity (mAh/g) | 1ˢᵗ Cycle Discharge Capacity (mAh/g) | 1ˢᵗ Cycle Efficiency |
|---|---|---|---|---|---|---|---|
| C2 | 98% | 166 | 7.3 | 3.15 | 381.2 | 330.0 | 86.6% |
| | graphite/ | 169 | 7.3 | 3.18 | 379.7 | 327.4 | 86.2% |
| | 2% PTFE | 161 | 7.3 | 3.17 | 381.3 | 330.5 | 86.7% |
| | (comparative | 174 | 7.5 | 3.11 | 381.7 | 329.0 | 86.2% |
| | example) | 161 | 7.1 | 3.22 | 380.2 | 327.1 | 86.0% |
| | | | Average: | | 380.8 | 328.8 | 86.3% |
| C3 | 96% | 178 | 7.7 | 3.19 | 394.3 | 329.0 | 83.4% |
| | graphite/ | 178 | 7.8 | 3.22 | 396.7 | 331.3 | 83.5% |
| | 4% PTFE | 176 | 7.7 | 3.21 | 397.6 | 332.4 | 83.6% |
| | (comparative | 176 | 7.7 | 3.22 | 397.4 | 332.5 | 83.7% |
| | example) | 176 | 7.6 | 3.20 | 395.7 | 328.7 | 83.1% |
| | | | Average: | | 396.3 | 330.8 | 83.5% |

As can be seen in Table 2, increasing the amount of PTFE reduces the first cycle efficiency as expected, owing to the further reaction between the PTFE and the lithium. For example, in the particular example of Table 2, the first cycle efficiency decreases from approximately 86.3% when using 2% PTFE to approximately 83.5% when using 4% PTFE. The data demonstrates that the beneficial effect of the additional binders in Table 1, above, is not attributable merely to the inclusion of additional total binder content, but rather to the inhibition of the PTFE-lithium reaction by the other binder(s) of the composite binder.

Figure 8:
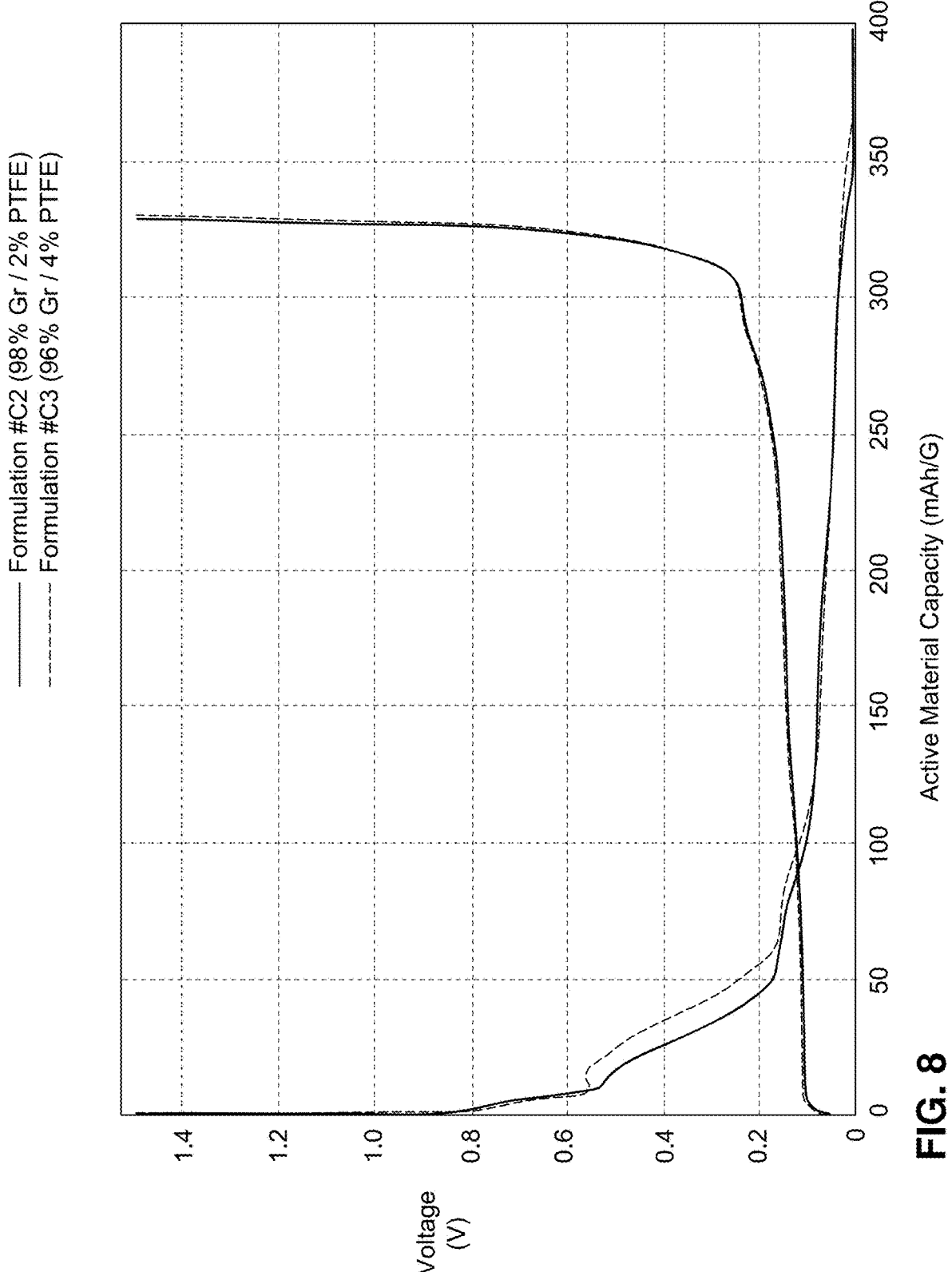
FIG. 8 shows first cycle charge and discharge curves for an electrode made by a dry process using 2% PTFE as compared to an electrode made by a dry process using 4% PTFE.

FIG. 8 shows first cycle charge and discharge curves for an electrode made by a dry process using 2% PTFE as the binder according to formulation C2 in Table 2 (solid lines) as compared to an electrode made by a dry process using 4% PTFE (dashed lines) according to formulation C3 in Table 2. As can be seen, the increased amount of PTFE results in an even more pronounced voltage plateau at around 0.55 V, which corresponds to the reduced first cycle efficiency shown in Table 2.

In the above example formulations provided in Tables 1 and 2, the dry powder mixture consists of electrode active material and composite binder. However, as noted above, a conductive material may be added as well. More generally, the dry powder mixture may comprise 90-98% active material and 2-10% composite binder, with the remaining 0-8% being conductive material, for example. In the case of a composite binder comprising PTFE and PEO, the PEO may range from 33-75% of the total binder content. In the case of a composite binder comprising PTFE and PVDF, the PVDF may range from 12-75% of the total binder content. In the case of a composite binder comprising PTFE and CMC, the CMC may range from 3-50% of the total binder content. In the case of a composite binder comprising PTFE and PVP, the PVP may range from 25-75% of the total binder content. The solvent that is added to the dry powder mixture to chemically activate the binder (see Steps 120 and 130 of FIG. 1) may be in an amount 1-8% by weight of the dry powder mixture (e.g. 2 grams per 100 grams of powder), for example. The solvent may be added and mixed in after the dry powder mixture is prepared and is not considered part of the dry powder mixture for purposes of the above formulation percentages.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A free-standing electrode film formed from a powder mixture, the free-standing electrode film comprising:
    an electrode active material;
    a composite binder comprising polytetrafluoroethylene (PTFE) and one or more additional binders selected from the group consisting of polyvinylpyrrolidone (PVP), polyvinylidene fluoride (PVDF), polyethylene oxide (PEO), and carboxymethylcellulose (CMC), the composite binder having been elongated by application of a shear force;
    0-5% conductive material by weight; and
    a solvent selected from the group consisting of hydrocarbons, acetates, alcohols, glycols, acetone, diethylcarbamazine (DEC), and tetrachloroethylene, the solvent having been added to the powder mixture prior to film formation to chemically activate the PTFE.

2. The free-standing electrode film of claim 1, wherein the composite binder comprises polyvinylidene fluoride (PVDF).

3. The free-standing electrode film of claim 1, wherein the composite binder comprises polyethylene oxide (PEO).

4. The free-standing electrode film of claim 1, wherein the composite binder comprises carboxymethylcellulose (CMC).

5. A method of manufacturing an electrode for an energy storage device, the method comprising laminating the free-standing electrode film of claim 1 on a current collector.

6. The free-standing electrode film of claim 1, wherein the free-standing electrode film comprises no conductive material.

7. The free-standing electrode film of claim 1, wherein the electrode active material has an exposed surface that is unblocked by the composite binder.

\* \* \* \* \*